US012611688B2

(12) United States Patent
Chen et al.

(10) Patent No.: US 12,611,688 B2
(45) Date of Patent: Apr. 28, 2026

(54) STRUCTURE FOR CONTROLLING WATER PASSAGE SWITCHING AND ON-OFF OF ELECTRICAL CIRCUIT USING SINGLE BUTTON AND SHOWER HEAD

(71) Applicant: Xiamen Solex High-Tech Industries Co., Ltd., Xiamen (CN)

(72) Inventors: Boren Chen, Xiamen (CN); Lian Zhang, Xiamen (CN); Tingke Liu, Xiamen (CN); Mingfu Zhang, Xiamen (CN)

(73) Assignee: Xiamen Solex High-Tech Industries Co., Ltd., Xiamen (CN)

( * ) Notice: Subject to any disclaimer, the term of this patent is extended or adjusted under 35 U.S.C. 154(b) by 435 days.

(21) Appl. No.: 18/109,918

(22) Filed: Feb. 15, 2023

(65) Prior Publication Data

US 2023/0201853 A1 Jun. 29, 2023

Related U.S. Application Data

(63) Continuation of application No. PCT/CN2021/112722, filed on Aug. 16, 2021.

(30) Foreign Application Priority Data

Aug. 17, 2020 (CN) ......................... 202010825547.0

(51) Int. Cl.
*B05B 12/02* (2006.01)
*B05B 1/16* (2006.01)
(Continued)

(52) U.S. Cl.
CPC .......... *B05B 12/002* (2013.01); *B05B 1/1636* (2013.01); *B05B 1/18* (2013.01)

(58) Field of Classification Search
CPC ....... B05B 12/002; B05B 1/1636; B05B 1/18; B05B 1/16; B05B 1/30
(Continued)

(56) References Cited

U.S. PATENT DOCUMENTS

2012/0261496 A1* 10/2012 Lev ....................... B05B 1/1636
239/443
2014/0138456 A1 5/2014 Lev
(Continued)

FOREIGN PATENT DOCUMENTS

CN 201026465 * 2/2008
CN 201026465 Y * 2/2008
(Continued)

OTHER PUBLICATIONS

International Search Report and English Translation cited in PCT/CN2021/112722, mailed Nov. 22, 2021.
(Continued)

*Primary Examiner* — Qingzhang Zhou
(74) *Attorney, Agent, or Firm* — Cooper Legal Group, LLC

(57) ABSTRACT

A structure for controlling water passage switching and on-off of an electrical circuit using a single button comprises an operating member, a transmission member, a water passage switching member, and an electrical circuit controlling module. The operating member drives the water passage switching member to rotate through the transmission member to achieve the water passage switching, and the water passage switching member drives the electrical circuit controlling module during a process of the water passage switching.

9 Claims, 7 Drawing Sheets

(51) Int. Cl.
*B05B 1/18* (2006.01)
*B05B 12/00* (2018.01)

(58) Field of Classification Search
USPC ......... 239/390–392, 394, 443, 444, 446–449
See application file for complete search history.

(56) References Cited

U.S. PATENT DOCUMENTS

| | | | | |
|---|---|---|---|---|
| 2016/0325291 | A1* | 11/2016 | Zhou | B05B 1/18 |
| 2018/0294703 | A1 | 10/2018 | Lin et al. | |

FOREIGN PATENT DOCUMENTS

| | | | |
|---|---|---|---|
| CN | 103962256 | A | 8/2014 |
| CN | 105202248 | A | 12/2015 |
| CN | 205701140 | U | 11/2016 |
| CN | 205761873 | U | 12/2016 |
| CN | 206519269 | U | 9/2017 |
| CN | 107350097 | A | 11/2017 |
| CN | 110976109 | A | 4/2020 |
| CN | 215465280 | U | 1/2022 |
| DE | 3306947 | A1 | 8/1984 |
| JP | S5284070 | | 7/1977 |
| JP | H09299832 | A | 11/1997 |
| JP | 2011087921 | A | 5/2011 |
| JP | 2016140767 | | 8/2016 |
| WO | 2016106693 | A1 | 7/2016 |

OTHER PUBLICATIONS

Written Opinion and English Translation cited in PCT/CN2021/112722, mailed Nov. 22, 2021.
First Office Action cited in CN202010825547.0, mailed Dec. 25, 2024, 11 pages.
Second Office Action cited in CN202010825547.0, mailed Jun. 25, 2025, 10 pages.
Notification of Grant cited in EP21857610.6, mailed Nov. 12, 2024, 6 pages.
First Office Action cited in EP21857610.6, mailed Jan. 29, 2024, 5 pages.
Search Report cited in EP21857610.6, mailed Jan. 11, 2024, 3 pages.
Notification of Grant cited in JP2022-576504, mailed Dec. 10, 2024, 5 pages.
First Office Action cited in JP2022-576504, mailed Jan. 24, 2024, 6 pages.
Second Office Action cited in JP2022-576504, mailed Jul. 2, 2024, 6 pages.
Search Report cited in JP2022-576504, mailed Jan. 9, 2024, 49 pages.

* cited by examiner

STRUCTURE FOR CONTROLLING WATER PASSAGE SWITCHING AND ON-OFF OF ELECTRICAL CIRCUIT USING SINGLE BUTTON AND SHOWER HEAD

RELATED APPLICATIONS

This application is a continuation of International patent application PCT/CN2021/112722, filed on Aug. 16, 2021, which claims priority to Chinese patent application 202010825547.0, filed on Aug. 17, 2020. International patent application PCT/CN2021/112722 and Chinese patent application 202010825547.0 are incorporated herein by reference.

FIELD OF THE DISCLOSURE

The present disclosure relates to a kitchen and toilet article, and in particular relates to a structure for controlling water passage switching of a water outlet terminal of the kitchen and toilet article.

BACKGROUND OF THE DISCLOSURE

A water passage switching device of water outlet terminals of traditional kitchen and bathroom articles, for example, a shower head with an electronic part, usually requires multiple buttons. A first button of the multiple buttons corresponds to switching of water spray patterns, and a second button of the multiple buttons corresponds to switching of an electrical circuit. Therefore, convenience of an appearance design and application is greatly limited.

BRIEF SUMMARY OF THE DISCLOSURE

The main technical problem to be solved in the present disclosure is to provide a structure for controlling water passage switching and on-off of an electrical circuit using a single button. The single button can not only control the water passage switching but also control the on-off of the electrical circuit, and the deficiencies with respect to having complicated operation and limited appearance in the traditional showers are solved.

In order to solve the technical problem, the present disclosure provides a structure for controlling water passage switching and on-off of an electrical circuit using a single button, the structure comprises an operating member, a transmission member, a water passage switching member, and an electrical circuit controlling module, the operating member drives the water passage switching member to rotate to achieve the water passage switching through the transmission member, and the water passage switching member drives the electrical circuit controlling module during a process of the water passage switching.

In a preferred embodiment, the electrical circuit controlling module is an electronic switch, the water passage switching member comprises one or more abutting blocks, and the one or more abutting blocks abut or are separated from the electronic switch during the process of the water passage switching.

In a preferred embodiment, the electrical circuit controlling module comprises a positive conductive column and a negative conductive column, the water passage switching member comprises one or more abutting blocks, and the one or more abutting blocks enable the positive conductive column to be in communication with the negative conductive column during the process of the water passage switching.

In a preferred embodiment, the one or more abutting blocks are disposed on an upper surface or a lower surface of a ratchet wheel along an axial direction of the ratchet wheel, so as to rotate by interlocking with the ratchet wheel.

In a preferred embodiment, the one or more abutting blocks are a plurality of abutting blocks distributed rotationally symmetrically around the axial direction of the ratchet wheel.

In a preferred embodiment, the plurality of abutting blocks, the water diversion rotating plate, and the ratchet wheel are connected together through an interlocking shaft.

In a preferred embodiment, the one or more abutting blocks are disposed on a ratchet pawl so as to swing by interlocking with the ratchet pawl.

In a preferred embodiment, the electronic switch is a self-locking switch.

In a preferred embodiment, the operating member is a button, the transmission member comprises a swinging member and a sliding member, two ends of the swinging member respectively abut the button and the sliding member, and a swinging shaft of the swinging member is disposed between the two ends of the swinging member.

In a preferred embodiment, one end of the sliding member away from the swinging member is operatively connected to the ratchet pawl to drive the ratchet pawl to be engaged with or be separated from teeth of the ratchet wheel.

The present disclosure further provides a structure for controlling water passage switching and on-off of an electrical circuit using a single button, the structure comprises an operating member, a transmission member, a water passage switching member, an abutting block, and an electronic switch, the operating member drives the abutting block to swing through the transmission member so as to drive the electronic switch to be turned on or be shut off, and the abutting block drives the water passage switching member to rotate to achieve the water passage switching during a swinging process of the abutting block.

In a preferred embodiment, the abutting block comprises a sliding groove extending in a radial direction of a swing arc of the abutting block, the operating member is a push button, a first end of the transmission member is slidably connected to the sliding groove, and a second end of the transmission member is operatively connected to the push button along a movement direction of the push button.

In a preferred embodiment, the water passage switching member comprises a water diversion rotating plate, the water diversion rotating plate is fixedly connected to the abutting block, and the abutting block drives the water diversion rotating plate to rotate so that a water hole of the water diversion rotating plate is in communication with different water outflow nozzles.

The present disclosure further provides a shower head, the shower head comprises a shower head body, and the structure for controlling the water passage switching and the on-off of the electrical circuit using the single button.

Compared with the existing techniques, the technical solution of the present disclosure has the following advantages.

In the present disclosure, the structure for controlling the water passage switching and the on-off of the electrical circuit using the single button uses the single button to drive the water passage switching member to move, and the water passage switching drives the one or more abutting blocks to rotate or swing during a process of the water passage switching so as to abut the electronic switch to enable the electrical function to be turned on or be shut off. In this way, the single button can not only control the water passage switching but also can control the on-off of the electrical circuit, so that the deficiencies with respect to a complex operation and limited appearance in the traditional showers are solved.

DETAILED DESCRIPTION OF THE EMBODIMENTS

Figure 1A:
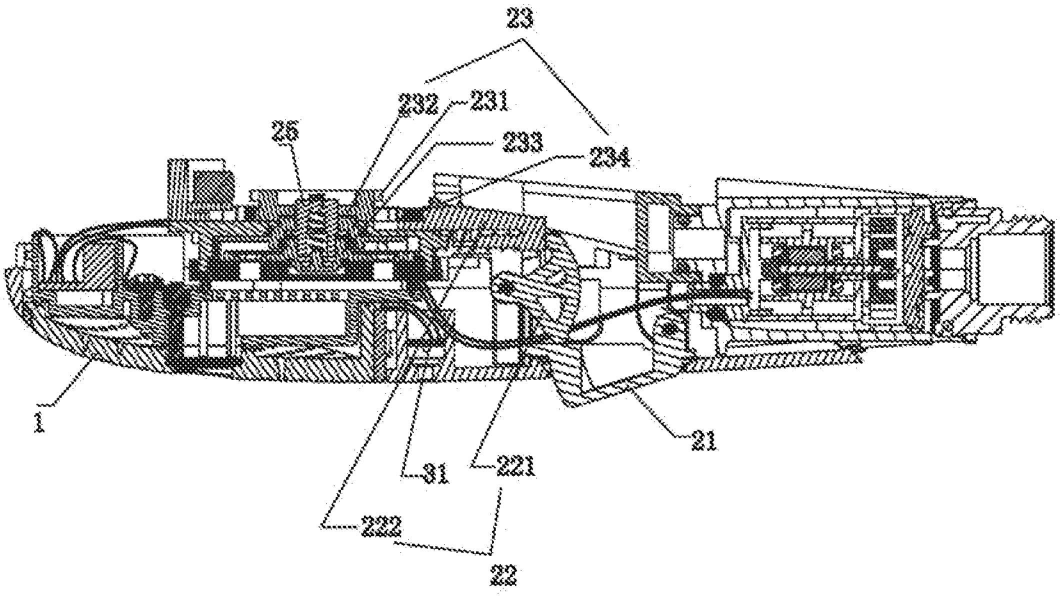
FIG. 1A illustrates a cross-sectional view of a shower head in Embodiment 1 of the present disclosure.

The technical solutions in the embodiments of the present disclosure will be clearly and completely described below in combination with the accompanying drawings in the embodiments of the present disclosure. The described embodiments are obviously only some embodiments of the present disclosure instead of all embodiments. All other embodiments obtained without creative work by a person of ordinary skill in the art based on the embodiments of the present disclosure fall within a scope of the protection of the present disclosure.

In the description of the present disclosure, it should be noted that an orientation or a positional relationship represented by the terms “upper”, “lower”, “inner”, “outer”, “top/bottom”, etc. is an orientation or a positional relationship shown based on the drawings. The orientation or the positional relationship is only used to facilitate a description of the present disclosure and simplify the description, rather than representing or implying that a pointed device or an element should have a specific orientation and be constructed and operated in a specific orientation. Therefore, the orientation or the positional relationship should not be understood as a limitation of the present disclosure. In addition, the terms “first” and “second” are only used for descriptive purposes and should not be understood as indicating or implying relative importance.

In the description of the present disclosure, it should be noted that the terms “installed”, “disposed”, “sleeved”, “connected”, etc., should be broadly understood. For example, “connected” can be a fixed connection, a detachable connection, or an integral connection, a mechanical connection, an electrical connection, a direct connection, an indirect connection through an intermediate medium, or a communication between inner sides of two members. For a person of ordinary skill in the art, specific meanings of the terms in the present disclosure can be understood under specific conditions.

Embodiment 1

Referring to FIGS. 1A to 4, the embodiment provides a shower head, and the shower head comprises a shower head body 1. The shower head body 1 comprises a shower water flow passage 4, a micro-current water flow passage 5, and a control board 31 configured to generate a micro-current.

The shower head body 1 further comprises a structure for controlling water passage switching and on-off of one or more electrical circuits using a single button. Water can be switched to micro-current water from ordinary shower water by a single operating member (i.e., the single button), and the control board 31 can be controlled to generate the micro-current by the single operating member at the same time.

In the present disclosure, the structure for controlling the water passage switching and the on-off of the one or more electrical circuits using the single button specifically comprises an operating member 21, a transmission member 22, a water passage switching member 23, and an electrical circuit controlling module. In this embodiment, the electrical circuit controlling module is one or more electronic switches 24. The water passage switching member 23 comprises one or more abutting blocks 231 cooperating with the one or more electronic switches 24. The operating member 21 drives the water passage switching member 23 to rotate through the transmission member 22 to achieve the water passage switching. The water passage switching member 23 drives the one or more electronic switches 24 to be turned on or shut off through the one or more abutting blocks 231 abutting or being separated from the one or more electronic switches 24 during a process of the water passage switching.

In this embodiment, the water passage switching member 23 comprises a ratchet wheel 232, a water diversion rotating plate 233 operatively connected to the ratchet wheel 232, and a ratchet pawl 234 operatively connected to the transmission member 22. The ratchet wheel 232 drives the water diversion rotating plate 233 to rotate, so that a water hole of the water diversion rotating plate 233 is in communication with different water outflow nozzles.

In this embodiment, a transmission manner between the one or more abutting blocks 231 and the water passage switching member 23 is that the one or more abutting blocks 231 rotate with a rotation of the water diversion rotating plate 233. Therefore, the one or more abutting blocks 231 are disposed on an upper surface or a lower surface of the ratchet wheel 232 along an axial direction of the ratchet wheel 232, so as to rotate by interlocking with the ratchet wheel 232. In this way, when the ratchet wheel 232 rotates, the one or more abutting blocks 231 and the water diversion rotating plate 233 will rotate synchronously with the rotation of the ratchet wheel 232. Specifically, the one or more abutting blocks 231, the water diversion rotating plate 233, and the ratchet wheel 232 are connected together through an interlocking shaft 25.

The water diversion rotating plate 233 will rotate continuously in a single direction with an operation of the operating member 21. Therefore, in order to ensure that the one or more electronic switches 24 can be turned on or shut off merely by pressing the operating member 21 twice, the one or more abutting block 231 comprise a plurality of abutting blocks 231 distributed rotationally symmetrically about the axial direction of the ratchet wheel 232.

In this embodiment, the operating member 21 is a button, and the transmission member 22 comprises a swinging member 221 and a sliding member 222. Two ends of the swinging member 221 respectively abut the button and the sliding member 222, and a swinging shaft of the swinging member 221 is disposed between the two ends of the swinging member 221. A first end of the sliding member 222 away from the swinging member 221 is operatively connected to the ratchet pawl 234 to drive the ratchet pawl 234 to be engaged with or be separated from ratchet teeth of the ratchet wheel 232. After the ratchet pawl 234 is separated from ratchet teeth of the ratchet wheel 232, the ratchet pawl 234 will rotate to pass through one of the ratchet teeth of the ratchet wheel 232 to drive the water diversion rotating plate 233 and the one or more abutting blocks 231 to rotate. Then, the ratchet pawl 234 is reset to an original position to be engaged with a next one of the ratchet teeth of the ratchet wheel 232, the rotation of the ratchet wheel 232 stops, the water diversion rotating plate 233 stops at a position in communication with the shower water flow passage 4 or the micro-current water flow passage 5, and the plurality of abutting blocks 231 also stop at a position abutting or separated from the one or more electronic switches 24.

Figure 2:
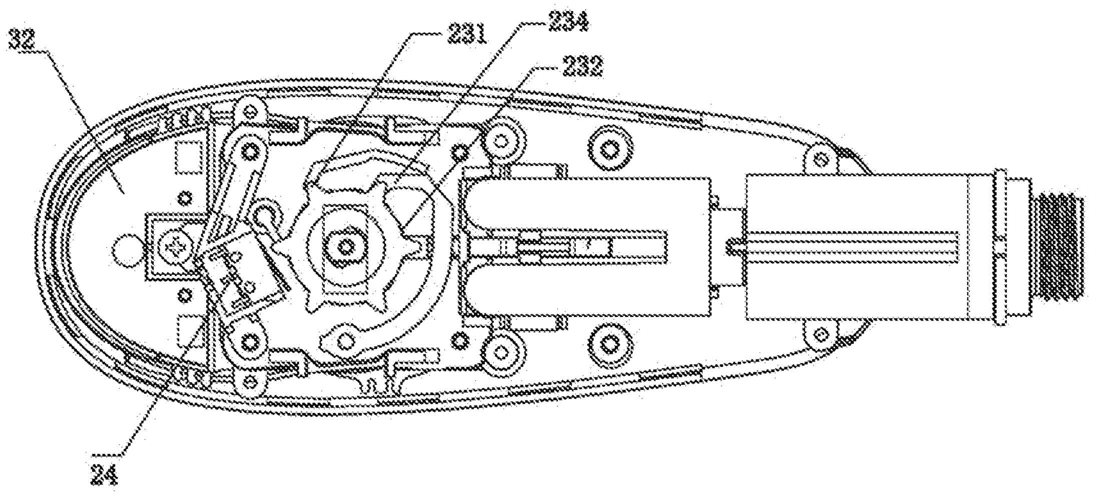
FIG. 2 illustrates a top view of the shower head when the one or more electronic switches are not pressed in Embodiment 1 of the present disclosure.
Figure 1B:
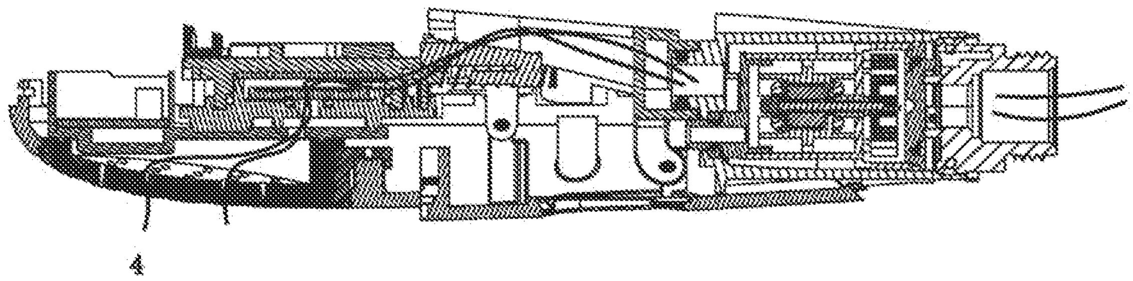
FIG. 1B illustrates a view of water flow status of the shower head when one or more electronic switches are not pressed in Embodiment 1 of the present disclosure.
Figure 3B:
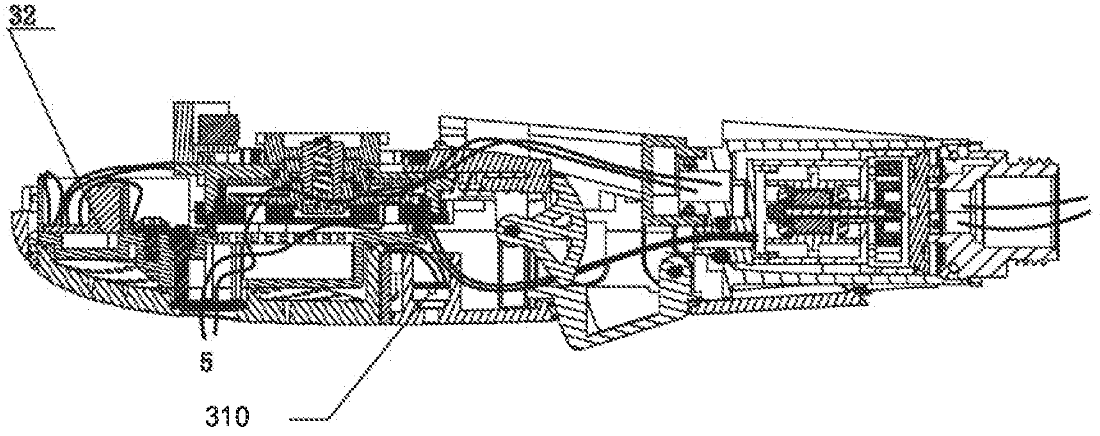
FIG. 3B illustrates a view of water flow status of the shower head when the one or more electronic switches are pressed in Embodiment 1 of the present disclosure.
Figure 3A:
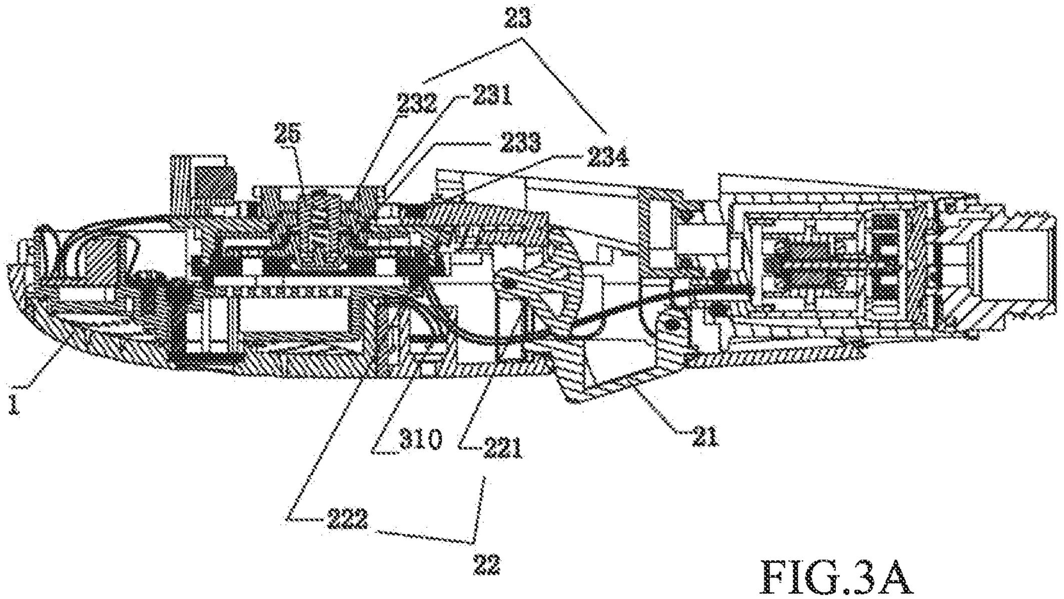
FIG. 3A illustrates a cross-sectional view of the shower head when the one or more electronic switches are pressed in Embodiment 1 of the present disclosure.
Figure 4:
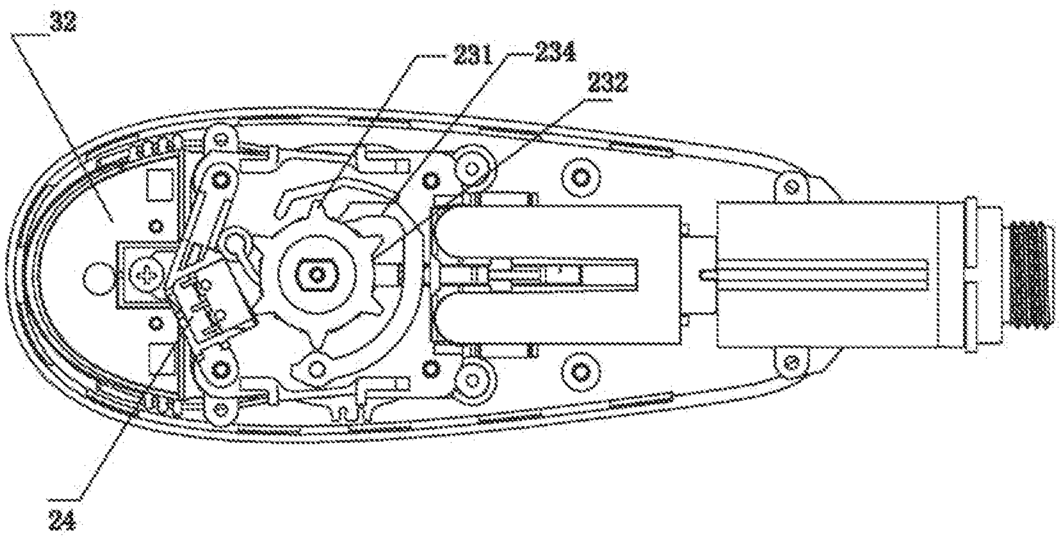
FIG. 4 illustrates a top view of the shower head when the one or more electronic switches are pressed in Embodiment 1 of the present disclosure.

When in use, as shown in FIGS. 1A, 1B, and 2, the shower head is in a state that the shower water flow passage 4 is in communication with water. When a water outflow function needs to be switched, the operating member 21 (i.e., the button) is pressed, the swinging member 221 is pushed to swing, and then the sliding member 222 is driven to move. A second end of the sliding member 222 is operatively connected to the ratchet pawl 234 to drive the ratchet pawl 234 to be separated from the ratchet teeth of the ratchet wheel 232 (as shown in FIGS. 3A, 3B, and 4), and the ratchet wheel 232 rotates to pass through one of the ratchet teeth of the ratchet wheel 232 to drive the water diversion rotating plate 233 and the plurality of abutting blocks 231 to rotate. The ratchet pawl 234 is then reset to the original position to be engaged with a next one of the ratchet teeth of the ratchet wheel 232, the rotation of the ratchet wheel 232 stops, the water diversion rotating plate 233 stops at a position in communication with the micro-current water flow passage 5, and the plurality of abutting blocks 231 also stop at a position abutting the one or more electronic switches 24. The one or more electronic switches 24 are turned on, so that the control board 31 configured to generate the micro-current is powered on, and an indicator light 310 is lighted up. Both of the water passage switching and the on-off of the one or more electrical circuits are controlled by the single button.

Embodiment 2

Figure 5:
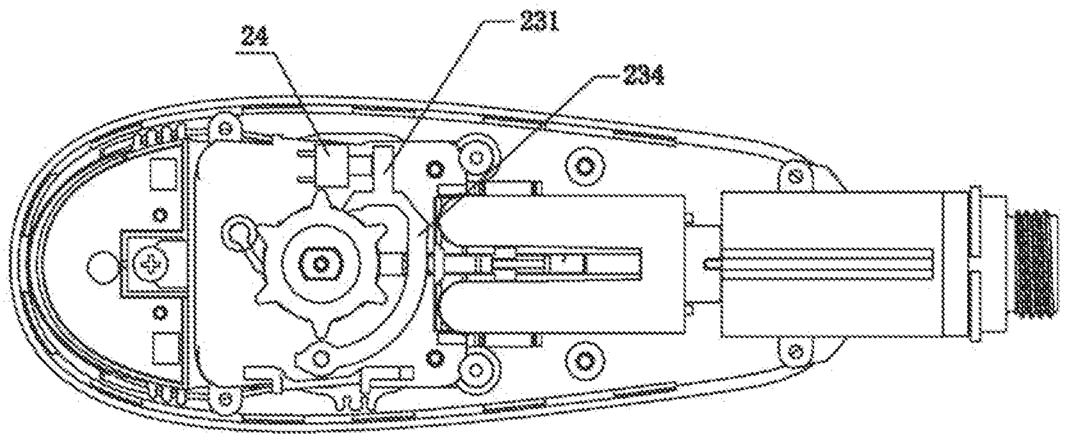
FIG. 5 illustrates a top view of a shower head when one or more electronic switches are not pressed in Embodiment 2 of the present disclosure.
Figure 6:
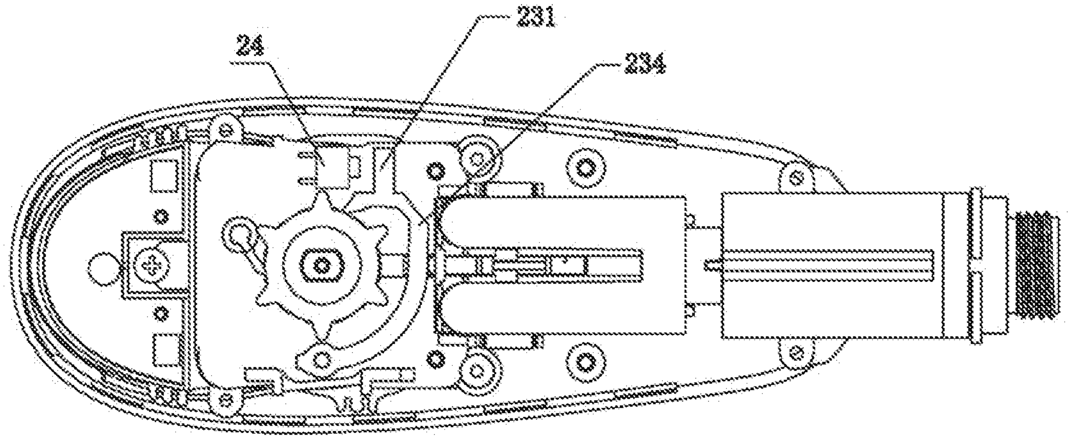
FIG. 6 illustrates a top view of the shower head when the one or more electronic switches are pressed in Embodiment 2 of the present disclosure.

Referring to FIGS. 5 and 6, this embodiment differs from Embodiment 1 in that the one or more abutting blocks 231 are disposed on the ratchet pawl 234 and swing by being interlocked with the ratchet pawl 234. Movement of the one or more abutting blocks 231 in this embodiment changes to swinging from the rotation in Embodiment 1.

When the operating member 21 drives the ratchet pawl 234 to move, the one or more abutting blocks 231 are driven to swing to achieve triggering of the one or more electronic switches 24. Since the ratchet pawl 234 is in a position in which the ratchet pawl 234 is engaged with the ratchet wheel 232 when the operating member 21 is not operated, the position will only change during the operation of the operating member 21. There is no way to enable the one or more abutting blocks 231 to be maintained in a state of abutting the one or more electronic switches 24, and the one or more electronic switches 24 in this embodiment are one or more self-locking switches for the foregoing reason. As long as the one or more electronic switches 24 are touched, a switch state of the one or more electronic switches 24 can be switched, and it is not necessary for the one or more abutting blocks 231 to abut the one or more electronic switches 24 all the time.

The remaining parts are the same as those in Embodiment 1 and will not be repeatedly described here.

Embodiment 3

Figure 7:
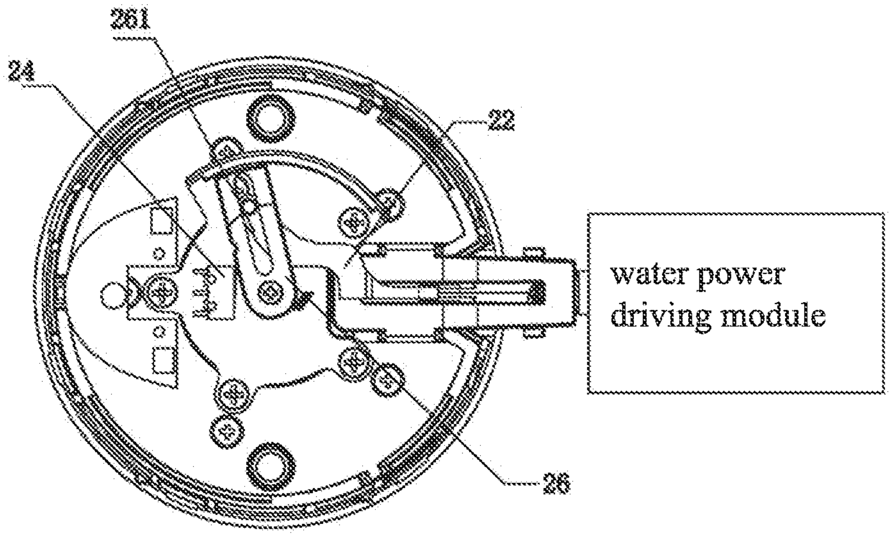
FIG. 7 illustrates a top view of a shower head when one or more electronic switches are pressed in Embodiment 3 of the present disclosure.
Figure 8:
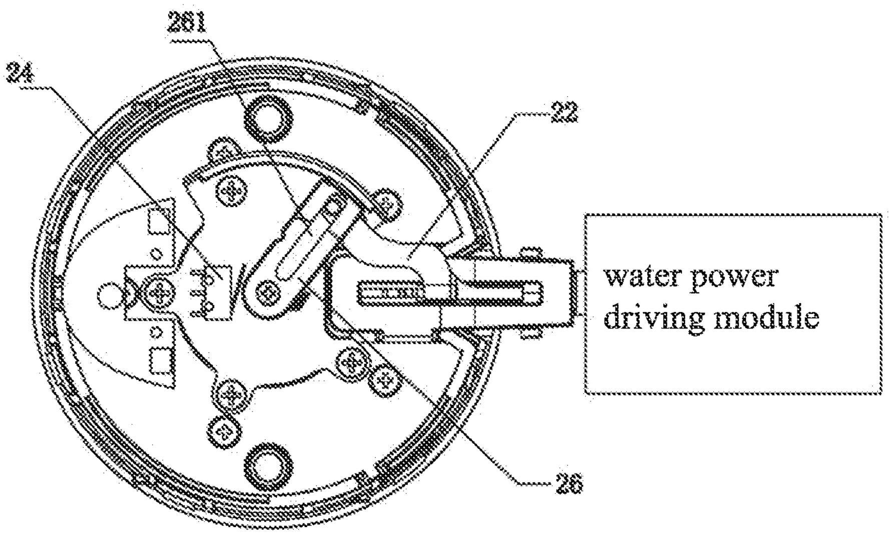
FIG. 8 illustrates a top view of the shower head when the one or more electronic switches are not pressed in Embodiment 3 of the present disclosure.
Figure 9:
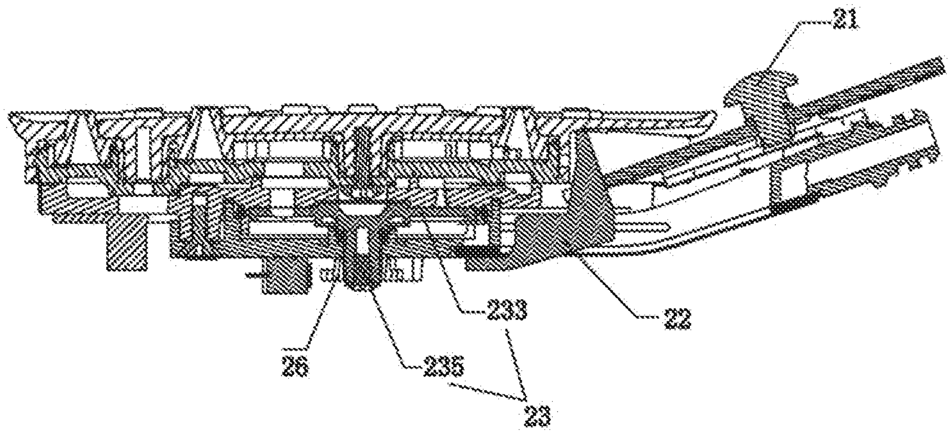
FIG. 9 illustrates a cross-sectional view of the shower head in Embodiment 3 of the present disclosure.

Referring to FIGS. 7-9, this embodiment differs from Embodiment 1 in that the operating member 21 directly drives an abutting block 26 to swing through the transmission member 22 to drive the one or more electronic switches 24 to be turned on or shut off, and the abutting block 26 drives the water passage switching member 23 to rotate to achieve the water passage switching during a swinging process of the abutting block 26.

In order to achieve swinging of the abutting block 26, the abutting block 26 comprises a sliding groove 261 extending in a radial direction of a swing arc of the abutting block 26, and the operating member 21 is a push button. A first end of the transmission member 22 is slidably connected to the sliding groove 261, and a second end of the transmission member 22 is operatively connected to the push button along a movement direction of the push button. When the push button is pushed, the first end of the transmission member 22 slides in the sliding groove 261, thereby driving the abutting block 26 to swing.

In order to enable the abutting block 26 to drive the water passage switching member 23 to swing together, the water passage switching member 23 comprises the water diversion rotating plate 233, and the water diversion rotating plate 233 is fixedly connected to the abutting block 26. The abutting block 26 drives the water diversion rotating plate 233 to rotate, so that the water hole of the water diversion rotating plate 233 is in communication with the different water outflow nozzles.

In this embodiment, the abutting block 26 is fixedly connected to the water diversion rotating plate 233 through a screw 235.

Embodiment 4

Figure 10:
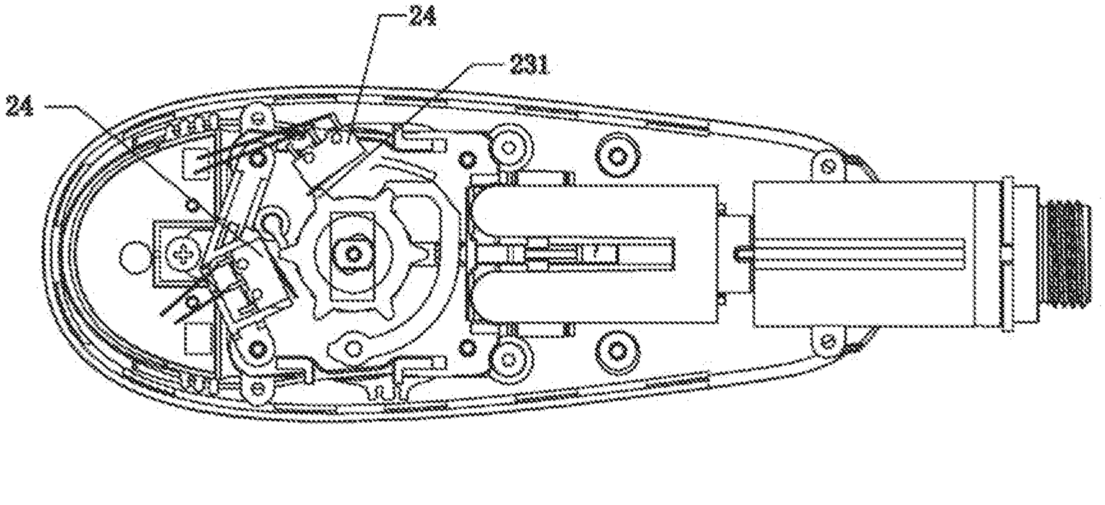
FIG. 10 illustrates a top view of a shower head in Embodiment 4 of the present disclosure.

Referring to FIG. 10, this embodiment differs from Embodiment 1 in that two electronic switches 24 are provided, so that when the one or more abutting blocks 231 abut a first one of the two electronic switches 24, the one or more abutting blocks 231 are separated from a second one of the two electronic switches 24. In this way, one of the one or more electrical circuits can be turned on while another one of the one or more electrical circuits is shut off, thereby achieving electronic function switching.

Embodiment 5

Figure 11:
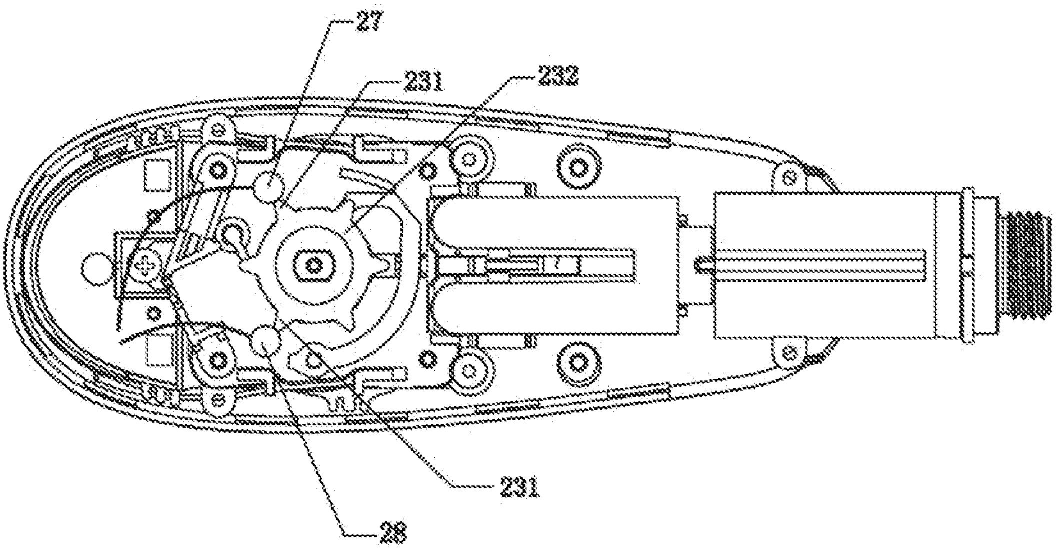
FIG. 11 illustrates a top view of a shower head in Embodiment 5 of the present disclosure.

Referring to FIG. 11, the electrical circuit controlling module comprises a positive conductive column 27 and a negative conductive column 28. A structure of the water passage switching member 23 is the same as that of Embodiment 1. When the ratchet wheel 232 rotates, one of the one or more abutting blocks 231 is connected to the positive conductive column 27, and another one of the one or more abutting blocks 231 is connected to the negative conductive column 28. Therefore, as long as the ratchet wheel 232 is made of conductive material, conductive connection between the positive conductive column 27 and the negative conductive column 28 can be turned on or shut off when the ratchet wheel 232 rotates, so as to achieve an opening or a closing of an electronic function.

Therefore, in the present disclosure, the structure for controlling the water passage switching and the on-off of the one or more electrical circuits using the single button is provided, and the operating member of the structure drives the water passage switching member to rotate to achieve the water passage switching through the transmission member. The water passage switching member drives the electrical circuit controlling module to control the water passage switching and the on-off of the one or more electrical circuits using the single button during a process of the water passage switching. The present disclosure can be used for various water outlet terminals for kitchens and toilets, such as showers for showering, kitchen showers, and the like.

The aforementioned embodiments are merely some preferred specific embodiments of the present disclosure, and the scope of the disclosure is not limited thereto. Thus, it is intended that the present disclosure cover any identical replacements and variations of the presently presented technical solutions and its modified conception provided they are made by person skilled in the art without departing from the technical scope of the present disclosure.

What is claimed is:

1. A structure for controlling water passage switching and on-off of an electrical circuit using a single button, comprising:

an operating member,
a transmission member,
a water passage switching member, and
an electrical circuit controlling module, wherein:
the operating member drives the water passage switching member to rotate to achieve the water passage switching through the transmission member,
the water passage switching member drives the electrical circuit controlling module during a process of the water passage switching,
the electrical circuit controlling module is an electronic switch,
the water passage switching member comprises one or more abutting blocks,
the one or more abutting blocks abut or are separated from the electronic switch during the process of the water passage switching to drive the electronic switch,
the water passage switching member comprises a ratchet wheel, a water diversion rotating plate operatively connected to the ratchet wheel, and a ratchet pawl operatively connected to the transmission member,
the ratchet wheel drives the water diversion rotating plate to rotate so that a water hole of the water diversion rotating plate is in communication with different water outflow nozzles, and
the one or more abutting blocks are disposed on the ratchet pawl so as to swing by interlocking with the ratchet pawl.

2. The structure for controlling the water passage switching and the on-off of the electrical circuit using the single button according to claim 1, wherein:
the one or more abutting blocks are disposed on an upper surface or a lower surface of the ratchet wheel along an axial direction of the ratchet wheel, so as to rotate by interlocking with the ratchet wheel.

3. The structure for controlling the water passage switching and the on-off of the electrical circuit using the single button according to claim 2, wherein:
the one or more abutting blocks are a plurality of abutting blocks distributed rotationally symmetrically around the axial direction of the ratchet wheel.

4. The structure for controlling the water passage switching and the on-off of the electrical circuit using the single button according to claim 3, wherein:
the plurality of abutting blocks, the water diversion rotating plate, and the ratchet wheel are connected together through an interlocking shaft.

5. The structure for controlling the water passage switching and the on-off of the electrical circuit using the single button according to claim 1, wherein:
the electronic switch is a self-locking switch.

6. The structure for controlling the water passage switching and the on-off of the electrical circuit using the single button according to claim 1, wherein:
the operating member is a button,
the transmission member comprises a swinging member and a sliding member,
two ends of the swinging member respectively abut the button and the sliding member, and
a swinging shaft of the swinging member is disposed between the two ends of the swinging member.

7. The structure for controlling the water passage switching and the on-off of the electrical circuit using the single button according to claim 6, wherein:
one end of the sliding member away from the swinging member is operatively connected to the ratchet pawl to drive the ratchet pawl to be engaged with or be separated from teeth of the ratchet wheel.

8. A shower head, comprising:
a shower head body, and
a structure for controlling water passage switching and on-off of an electrical circuit using a single button, comprising:
an operating member,
a transmission member,
a water passage switching member, and
an electrical circuit controlling module, wherein:
the operating member drives the water passage switching member to rotate to achieve the water passage switching through the transmission member,
the water passage switching member drives the electrical circuit controlling module during a process of the water passage switching,
the shower head body comprises a shower water flow passage, a micro-current water flow passage, and a control board configured to generate a micro-current, the operating member is a button, the electrical circuit controlling module is an electronic switch, the water passage switching member comprises one or more abutting blocks, the one or more abutting blocks abut or are separated from the electronic switch during the process of the water passage switching to drive the electronic switch, the electronic switch is in communication with the control board, the water passage switching member comprises a ratchet wheel, a water diversion rotating plate operatively connected to the ratchet wheel, and a ratchet pawl operatively connected to the transmission member, the ratchet wheel drives the water diversion rotating plate to rotate so that a water hole of the water diversion rotating plate is in communication with different water outflow nozzles, and the one or more abutting blocks are disposed on the ratchet pawl so as to swing by interlocking with the ratchet pawl.

9. A structure for controlling water passage switching and on-off of an electrical circuit using a single button, comprising:

an operating member, a transmission member, a water passage switching member, and an electrical circuit controlling module, wherein:

the operating member drives the water passage switching member to rotate to achieve the water passage switching through the transmission member, the water passage switching member drives the electrical circuit controlling module during a process of the water passage switching, the electrical circuit controlling module comprises a positive conductive column and a negative conductive column, the water passage switching member comprises one or more abutting blocks, the one or more abutting blocks enable the positive conductive column to be in communication with the negative conductive column during the process of the water passage switching, the water passage switching member comprises a ratchet wheel, a water diversion rotating plate operatively connected to the ratchet wheel, and a ratchet pawl operatively connected to the transmission member, the ratchet wheel drives the water diversion rotating plate to rotate so that a water hole of the water diversion rotating plate is in communication with different water outflow nozzles, and the one or more abutting blocks are disposed on the ratchet pawl so as to swing by interlocking with the ratchet pawl.

* * * * *